July 11, 1961 F. J. LUPO 2,991,871
FEED WHEEL FOR FEEDING INTERMITTENTLY MOVABLE PARTS
Filed March 27, 1958 2 Sheets-Sheet 1

INVENTOR.
FRITZ J. LUPO
BY
ATTORNEYS

July 11, 1961 F. J. LUPO 2,991,871
FEED WHEEL FOR FEEDING INTERMITTENTLY MOVABLE PARTS
Filed March 27, 1958 2 Sheets-Sheet 2
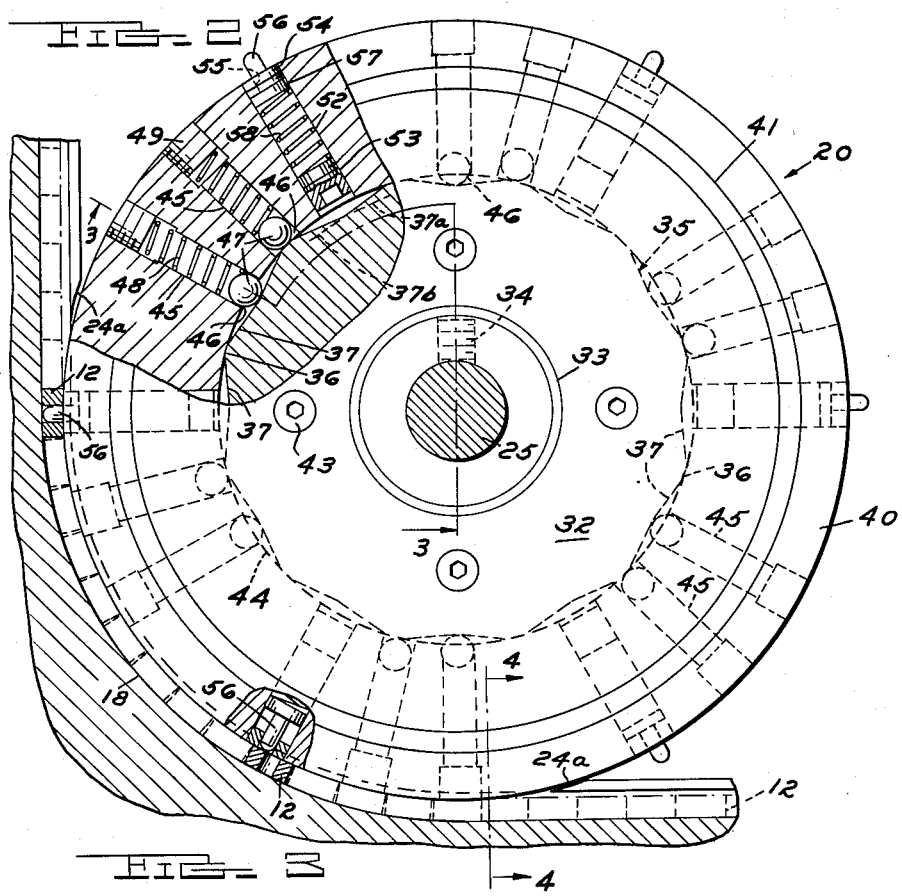
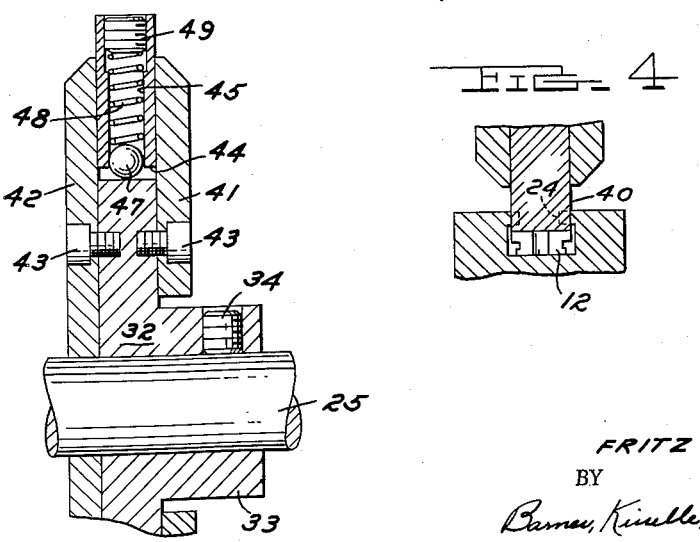
INVENTOR.
FRITZ J. LUPO
BY
ATTORNEYS United States Patent Office 2,991,871
Patented July 11, 1961

2,991,871
FEED WHEEL FOR FEEDING INTERMITTENTLY MOVABLE PARTS
Fritz J. Lupo, Detroit, Mich., assignor to Feedmatic-Detroit, Inc., Detroit, Mich., a corporation of Michigan
Filed Mar. 27, 1958, Ser. No. 724,379
10 Claims. (Cl. 198—212)

One application of the present invention is in feeding a train of parts such as nuts through a track extending from a supply hopper to a machine which assembles the nuts to other parts in the manufacture of various products.

In such arrangements the nuts are fed in aligned relation into a track from a hopper and means are provided for advancing the nuts through the track to an assembling machine which accepts the nuts often one at a time. The whole train of nuts upstream of the assembling machine moves intermittently as the leading nut is fed into the machine. The track is frequently several feet long and may follow an upward path to the assembling machine so that considerable motive force must be applied to the train. It is desirable to apply continuous force to the train so that the nuts will feed at any time into the assembling machine regardless of its time cycle of operation. This eliminates complex and expensive coordinating apparatus between the feeding mechanism and the assembling machine.

Heretofore one type of feeding mechanism has employed a clutch arrangement which would slip during dwell periods between intermittent movements of the parts. Another type of feeder has used a continuously turning wheel with spring pressed plungers which engage the parts but can be forced to a retracted position by the parts when they are restrained from movement to permit the wheel to continue turning during dwell periods. The clutch type feeder is objectionable in that the relatively slipping faces are subject to wear and are subject to heating up so that they must be exposed for cooling. The continuously turning wheel and plunger arrangement is objectionable in that while the parts are stationary the plungers on the wheel have a hammering action tending to damage the stationary parts.

An object of this invention is to provide a simple, inexpensive, improved feeding mechanism which eliminates the above objections.

The invention is carried out generally by providing a continuously motor driven disk having a circumferential cam surface surrounded by a ring with spring pressed cam followers urged radially inwardly against the cam surface. The cam surface has alternate crests and inclined portions and engagement of the followers therewith provides a yieldable driving connection between the disk and ring or rim. The rim is provided with studs which engage the parts to be moved through the track. The ring is restrained against movement by the parts when they are stationary while the disk continues to turn. The cam followers are arranged so that they engage oppositely inclined portions of the cam to minimize pulsations in the drive force imparted to the ring when stationary by the disk. One form of the invention is illustrated in the accompanying drawings.

FIGURE 2 is an enlarged fragmentary elevational view of the apparatus with parts shown sectionally and illustrating detail in the construction of the feed wheel.

FIGURE 3 is a sectional view on line 3—3 of FIGURE 2.

FIGURE 4 is a sectional view on line 4—4 of FIGURE 2.

Figure 1:
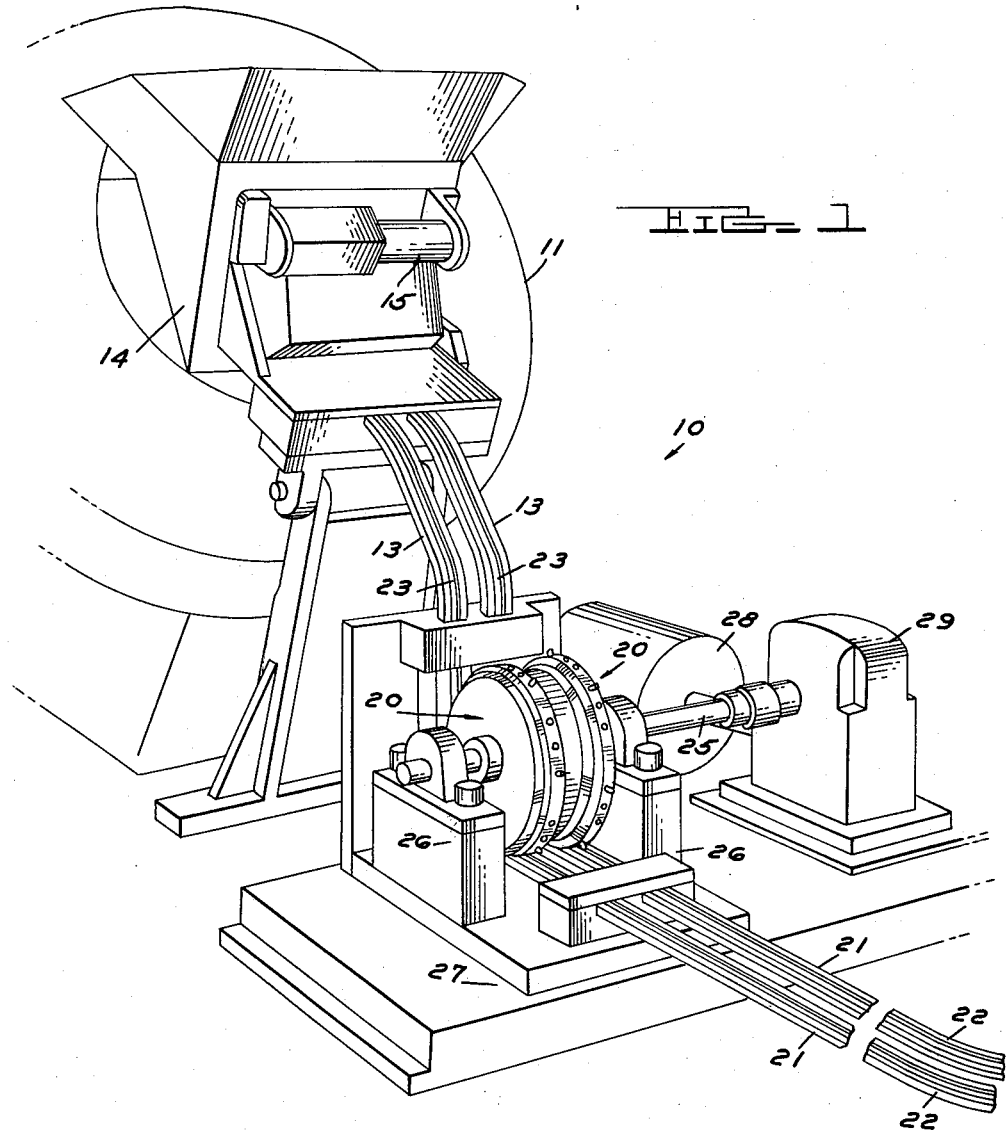
FIGURE 1 is a partly diagrammatic perspective view illustrating apparatus utilizing the feed wheel of this invention.

Shown in FIGURE 1 is a feeding mechanism 10 including a conventional rotary hopper 11 which delivers aligned parts such as nuts 12 in trains to a pair of downwardly extending tracks 13. A vibrator is illustrated at 14 which assists in moving the aligned nuts through the upstream ends of the tracks. The vibrator is shown as having an air cylinder 15 within which a piston (not shown) is rapidly pneumatically oscillated. Each track 13 extends downwardly, then through a curved portion 18 around the periphery of a feed wheel 20 according to this invention and continues in a horizontal portion 21 which may be upturned as at 22 in its approach to a machine (not shown) to which the nuts are furnished. Each track has reentrant channel conformation as illustrated and has a longitudinally extending slot 23. The inturned portions 24 of the channel contain nuts 12 therein but these portions are cut away as at 24a (FIGURE 2) adjacent wheel 20 for a purpose to be described.

Feed wheels 20 are supported by shafting 25 journaled on supports 26 on a base 27 and the shafting is continuously rotated by an electric motor 28 through a gear box 29. Wheel 20 includes a central portion 32 having a hub 33 nonrotatably secured on shaft 25 by such means as a set screw 34. For the sake of convenience only, central portion 32 is referred to in this description and in the claims as a disk. The outer peripheral surface 35 of the disk is provided with a series of circumferentially equally spaced crests 36 flanked by inclined portions 37 which lie generally on chords of the circle defined by the crests. Chordal portions 37 on the opposite sides of each crest are preferably equally angled to radii passing through the crest. In the form of the invention illustrated, the chordal portions between the crests each have two portions which are angled relatively to each other as indicated by dotted lines 37a and 37b (FIGURE 2). The chordal portions may be said to define depressions between the crests.

Each feed wheel 20 includes a ring or rim portion 40 mounted concentrically around disk 32 and for this purpose a pair of annular plates 41 and 42 are secured to the disk by such means as cap screws 43. These plates project radially outwardly of disk 32 and provide a circumferential channel within which ring 40 is contained. The inner peripheral surface 44 of the ring is apposed to cam surface 35 at the outer periphery of disk 32.

Ring 40 has a number of pairs of radially extending bores 45, each having an open inner end 46 through which a ball 47 is urged for engagement with cam surface 35 by a coil spring 48 reacting on a threaded plug 49 at the end of the bore. Bores 45 in ring 40 are spaced apart circumferentially a distance such that when one ball 47 of a pair of balls engages a crest 36 in cam surface 35, the other ball of the pair engages approximately the midpoint of an adjacent chordal portion of the cam surface (FIGURE 2). This arrangement provides a yieldable driving connection between disk 32 and ring 40.

Ring 40 also has a number of radially extending bores 52 having a threaded plug 53 at its inner end and a threaded plug 54 at its outer end. Plug 54 has a central opening 55 through which projects a stud 56 having a head 57 within the bore and acted on by a coil spring 58 which reacts against plug 53. Spring 58 yieldably urges stud 56 toward its outwardly projecting position.

In the illustrated form of the invention, disk 40 has six pairs of bores 45 and cam follower balls 47 and six bores 52 with studs 56 spring pressed outwardly therefrom. Cam surface 35 is shown as having twelve crests 36 with flanking inclined portions 37. These numbers of elements may be varied as required but it is preferable to arrange the pairs of balls 47 symmetrically around the wheel.

In use, feed wheels 20 are disposed adjacent tracks 13 so that the outer periphery of ring 40 enters the track at its curved region 18 where portions 24 of the track are cut away. Ring 40 thereby contains the nuts within the curved region 18 of the track. Motor 28 is set into continuous operation, thereby continuously turning shaft 25 and disk 32. An inclined portion 37 of cam surface 35 engages a ball 47 of each pair of balls and this ball is restrained against outward radial movement by its spring 48 so that ring 40 tends to turn with disk 32. Ring 40 turns until one of its outwardly projecting studs 56 snaps into the hole in a nut 12 under the action of its spring 58.

Thereafter until stud 56 is withdrawn from the nut wheel 20 through ring 40 exerts continuous motive force on the train of nuts tending to feed the train toward the downstream end 22 of the track. If the train of nuts is free to move, wheel 20 moves it. When, however, the train of nuts is restrained against movement such as during the periods when no nuts are feeding out of the end of the track, ring 40 is held stationary. Disk 32 continues to turn with shaft 25. Inclined portions 37 of cam surface 35 force balls 47 engaged thereby radially outwardly against the action of springs 48. Thus the driving connection between disk 32 and ring 40 is yieldable.

When one ball 47 of each pair rides up an inclined portion 37 on one side of a crest 36, the other ball of the pair rides down the adjacent inclined portion 37. Also when a ball passes over a crest 35, its mate begins its travel up an adjacent incline. Thus the tendency of a ball to snap over a crest is counteracted by the force of the spring on the neighboring ball which resists any sudden compression. This minimizes any pulsating transmission of torque from disk 32 to ring 40 and eliminates the danger of pin 56 hammering on the interior of a nut 12 with which it is engaged. A relatively smooth application of torque is provided tending continuously to move the train of nuts. This insures against damage to the parts being moved through track 13.

Ring 40 turns continuously or intermittently according to whether nuts are fed continuously or intermittently out of the end of the track. When a succeeding pin 56 is rotated into region 18 of the track, it may in some circumstances not exactly align with a hole in a nut 12. In this situation the pin will be forced by a surface portion of the nut to retract into its bore 52 against the action of spring 58. This condition is illustrated in a lower portion of FIGURE 2. If subsequent conditions should result in a turning movement of wheel 20 relative to the train of nuts, the retracted pin 56 will merely snap into the hole in the nut and thus establish a driving connection between that pin and the train of nuts. This construction insures against damage to the wheel itself or to parts in the track.

The stress in springs 48 which back up balls 47 may be adjusted by turning plugs 49 to regulate the strength of the driving connection between disk 32 and ring 40. By this adjustment the spring pressure on each pair of balls may be equalized to provide balanced action thereof and thereby keep pulsations in the torque on ring 40 at a minimum. Similarly, the stress of springs 52 may be adjusted by turning threaded plugs 53 to regulate the outwardly biasing force on pins 56.

I claim:

1. Apparatus for moving parts along a track comprising, a first member having along a peripheral portion a series of alternately arranged crests and depressions, a second member movable relatively to said first member and having a plurality of followers yieldably spring urged into engagement with said peripheral portion of said first member to thereby form a yieldable driving connection between said members, said followers being movable to follow said series of crests and depressions to facilitate movement of one of said members when movement of the other of said members is restrained, motor means operative to move said one member continually, said followers being even in number and being spaced apart so that whenever one of said followers engages a crest another follower engages substantially a midpoint of a depression, said depressions having generally similarly angled portions on opposite sides of said crests engaged by said followers upon relative movement of said members and the spring pressures on said followers being generally similar, whereby to minimize pulsations in the driving force of said one member transmitted to said other member, and means operably connected to said other member adapted to engage and move along a path a part with which said apparatus is adapted to be used.

2. Apparatus for moving parts along a track comprising, an inner member, a ring member, means securing said ring member substantially concentrically and rotatably around said inner member with the outer peripheral portion of said inner member and the inner peripheral portion of said ring member apposed, one member having along its peripheral portion a circumferential array of crests with portions between said crests extending in generally chordal directions, the other member having a plurality of followers with spring means urging said followers in a generally radial direction into engagement with said peripheral portion of said one member to thereby form a yieldable driving connection between said members, motor means operable to rotate one of said members continuously for imparting continuous driving force to the other member, said followers being even in number and being spaced apart so that whenever one of said followers engages a crest another follower engages substantially a midpoint of a chordal portion, said chordal portions being generally similarly angled on opposite sides of said crests and the spring pressures on said followers being generally similar, whereby to minimize pulsations in the driving force imparted by the motor driven member to the other member when movement of the latter is restrained, and means operably connected to the latter said member adapted to engage and move along a path a part with which said apparatus is adapted to be used.

3. Apparatus for moving parts along a track comprising, a disk, a ring, means mounting said ring rotatably and substantially concentrically around said disk, said disk having a cam surface at its outer peripheral portion which includes a circumferential array of crests and generally chordal portions in alternate arrangement, said ring having an inner peripheral portion apposed to said cam surface, motor means operable to rotate said disk continuously, said ring having a plurality of circumferentially arranged followers radially spring pressed into engagement with said cam surface to provide a yieldable driving connection between said disk and ring, said followers being even in number and being circumferentially spaced so that whenever one of said followers engages substantially a midpoint of a crest another follower engages a chordal portion, said chordal portions being generally similarly angled on opposite sides of the crests and the spring pressures on said followers being generally equal, whereby to minimize pulsations in the driving force of said disk transmitted to said ring when rotation of the latter is restrained, and means operably connected to said ring adapted to engage and move along a path a part with which said apparatus is adapted to be used.

4. Apparatus for moving parts along a track comprising, a disk, a ring, means mounting said ring rotatably and substantially concentrically around said disk, said disk having a cam surface at its outer peripheral portion which includes a circumferential array of crests and generally chordal portions in alternate arrangement, said ring having an inner peripheral portion apposed to said cam surface, motor means operable to rotate said disk continuously, said ring having a circumferential array of generally radial bores, a ball in each bore engaged by the bore wall adjacent the radially inner end of the bore, a spring in each bore engaging said ball and yieldably urging said ball into engagement with said cam surface to provide a yieldable driving connection between said disk and ring, said chordal portions being angled generally equally on opposite sides of said crests and the pressures of said springs on said balls being generally similar, whereby to minimize pulsations in the driving force of said disk transmitted to said ring when rotation of the latter is restrained, and means operably connected to said ring adapted to engage and move along a path a part with which said apparatus is adapted to be used.

5. The combination defined in claim 4 wherein each of said springs reacts radially outwardly against a plug which is longitudinally movable within said bore to regulate the spring force on said balls.

6. Apparatus for moving parts along a track comprising, a disk, a ring, means mounting said ring rotatably and substantially concentrically around said disk, said disk having a cam surface at its outer peripheral portion which includes a circumferential array of crests and generally chordal portions in alternate arrangement, said ring having an inner peripheral portion apposed to said cam surface, motor means operable to rotate said disk continuously, said ring having a plurality of circumferentially spaced pairs of generally radial bores, a ball in each bore spring urged into engagement with said cam surface to establish a yieldable driving connection between said disk and ring, the balls in each pair of bores being spaced apart circumferentially to engage successive chordal portions of said cam surface, said chordal portions being generally similarly angled on opposite sides of said crests and the spring pressures on said balls being generally similar, whereby to minimize pulsations in the driving force of said disk transmitted to said ring when rotation of the latter is restrained, and means operably connected to said ring adapted to engage and move along a path a part with which said apparatus is adapted to be used.

7. Apparatus for moving parts along a track comprising, a disk, a ring, means mounting said ring rotatably and substantially concentrically around said disk, said disk having a cam surface at its outer peripheral portion which includes a circumferential array of crests and generally chordal portions in alternate arrangement, said ring having an inner peripheral portion apposed to said cam surface, motor means operable to rotate said disk continuously, said ring having a circumferential array of generally radial bores, a ball in each bore engaged by the bore wall adjacent the radially inner end of the bore, a spring in each bore engaging said ball and yieldably urging said ball into engagement with said cam surface to provide a yieldable driving connection between said disk and ring, said chordal portions being angled generally equally on opposite sides of said crests and the pressures of said spring on said balls being generally similar, whereby to minimize pulsations in the driving force of said disk transmitted to said ring when rotation of the latter is restrained, said ring having a plurality of circumferentially spaced pins movably mounted thereon and spring urged to positions projecting outwardly of said ring, said pins being engageable with parts with which said apparatus is adapted to be used for moving said parts along a path, the spring pressures on said pins being sufficient to secure said pins in engagement with such parts when movement thereof is restrained, said driving connection being yieldable under a force less than that necessary to turn said ring when movement of the parts is restrained by engagement of said pins with such parts.

8. The combination defined in claim 7 wherein said ring has additional radial bores opening at the outer peripheries of said ring, said pins being disposed in said additional bores and projecting radially outwardly thereof, said additional bores having springs therein acting upon said pins and reacting upon plugs within said bores, said plugs being longitudinally adjustable in said bores for regulating the pressures of the latter said springs on said pins.

9. Apparatus for applying continuous motive force to intermittently movable objects comprising, a wheel having a hub member with a rim member mounted for rotation relative thereto, motor means operative to rotate one of said members continuously, means forming a driving connection between said members through which torque is transmitted from said one member to the other member, said means including a circumferential cam surface on one member having a plurality of relatively inclined portions with crests therebetween and a plurality of cam followers spaced circumferentially on the other member spring pressed in a radial direction into engagement with said cam surface, said inclined portions and spring pressed cam followers cooperating to resist relative rotation of said members, whereby to transmit continuous torque from the motor driven member to the other member so that the latter member tends continuously to move objects with which said apparatus is adapted to be used, said cam followers being movable against the spring pressures thereon so that said driving connection yields when the latter member is restrained from movement during periods between intermittent movement of the objects to be moved, said spring pressed cam followers being circumferentially disposed so that whenever one rides up an inclined portion another rides down another inclined portion and so that whenever one follower engages a crest another follower engages a portion of said cam surface substantially midway between two crests, whereby to minimize pulsations in the driving force of said motor driven member transmitted to the other member.

10. Apparatus for applying continuous motive force to intermittently movable articles comprising, means forming a feed wheel with substantially concentric inner and outer relatively rotatable members, one of which has a cam surface defined by a circumferential series of substantially similar radially projecting interconnected protrusions with substantially symmetrical inclined sides radially facing a portion of the other member, means providing a circumferential series of cam followers on said other member yieldably spring urged against the cam surface defined by said protrusions, motor means operable to rotate one of said members continuously and means providing a circumferential array of circumferentially fixed radially retractable article-moving studs on the other member yieldably spring urged to a radially projecting position for applying motive force to intermittently movable articles, said cam followers being circumferentially grouped to engage equal numbers of oppositely inclined sides of said protrusions, whereby to minimize pulsation in the torque transmitted through the stud-carrying member to the articles during periods between intermittent movements of the articles.

References Cited in the file of this patent

UNITED STATES PATENTS

| | | |
|---|---|---|
| 651,706 | Forbes | June 12, 1900 |
| 1,067,034 | Keller | July 8, 1913 |
| 1,106,607 | Woellert | Aug. 11, 1914 |
| 1,527,724 | Wool et al. | Feb. 24, 1925 |
| 2,362,132 | Haub | Nov. 7, 1944 |
| 2,661,866 | Lubbert et al. | Dec. 8, 1953 |

FOREIGN PATENTS

| | | |
|---|---|---|
| 115,152 | Great Britain | May 2, 1918 |
| 134,154 | Switzerland | Sept. 16, 1929 |